W. McALL.
Corn Sheller.
No. 3,540.
Patented April 13, 1844.
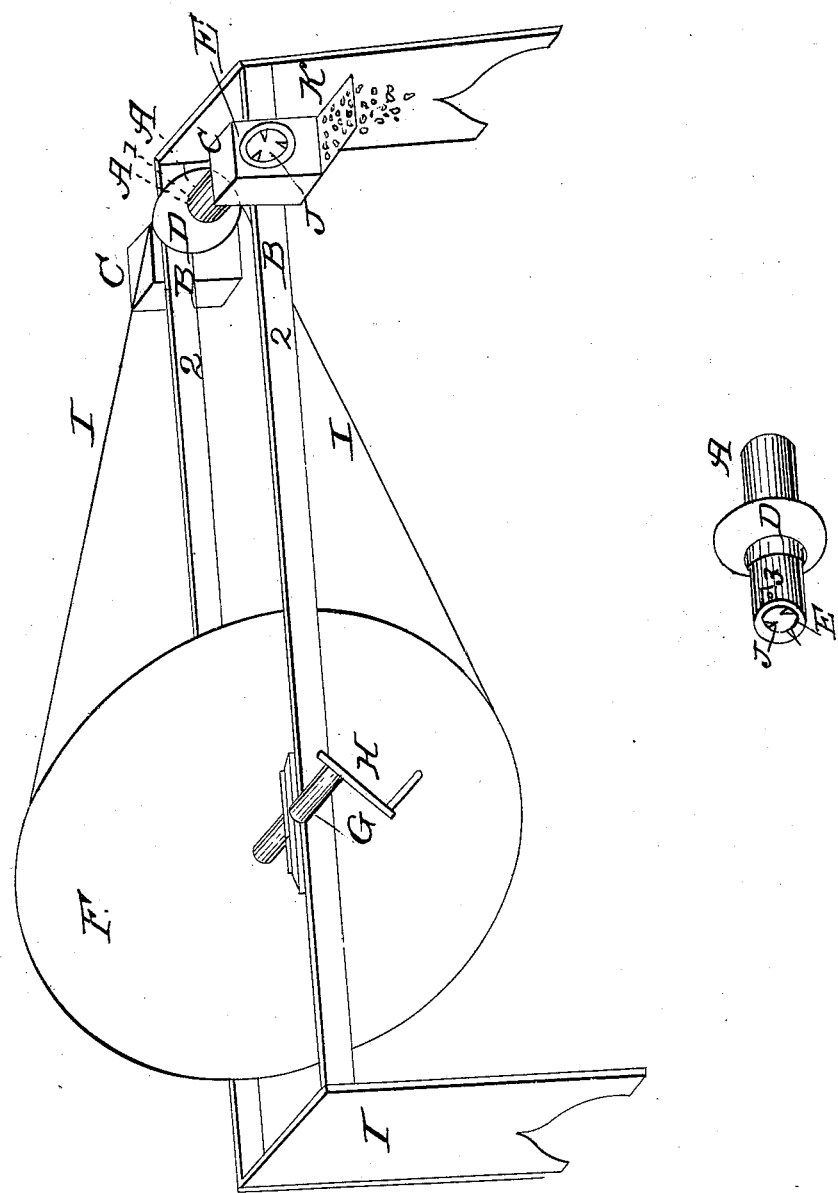

UNITED STATES PATENT OFFICE.

WM. McALL, OF TALLADEGA, ALABAMA.

CORN-SHELLER.

Specification of Letters Patent No. 3,540, dated April 13, 1844.

*To all whom it may concern:*

Be it known that I, WILLIAM MCALL, of Talladega, in the county of Talladega and State of Alabama, have invented a new and useful Machine for Shelling Corn, which may be known as the "Fistular Sheller"; and I do hereby declare that the following is a full, clear, and exact description of the construction and operation of the same, reference being had to the annexed drawings, making a part of this specification, in which—

Figure 1, is a perspective view, Fig. 2, a longitudinal elevation, Fig. 3, a transverse section.

To enable others to make and use my invention I proceed to describe its construction and operation.

The fistular cylinder as shown at A, in the accompanying drawing if made of wood, should be of hard wood, and if intended for a double sheller, should be eight inches long and two and one fourth inches in diameter at the bearing on which it turns, three inches in the center, forming shoulders to keep it steady between the bearings, on which I place a pulley or cog wheel D, (as either will do) four and a half inches in diameter, the fistular in the cylinder, as shown at J, I make one and three fourths inches in diameter. If I make a double sheller, and make it of wood, I make two rings of iron, on which are three teeth or spurs, marked E, set at equal distance on the rings and projecting a half inch, ranging with the inside of the ring, and tapering to a point with the point verging a sixteenth of an inch inward. These rings are placed on the ends of the fistular cylinder, by means of two rings extending from the back of the rings on the fistular cylinder which are made fast by screws. If I make the fistular cylinder of cast iron, the spurs or teeth are cast with it, which supersedes the necessity of the rings—when the fistular cylinder is made of cast iron, it is of the same dimensions as those of wood, the principle being the same, the fistular cylinder is placed on a frame, as shown in the drawing, marked B, B, on which frame I place the driving wheel F, which I make four feet in diameter—G the bearings of which is the same distance apart as those of the cylinder, to one end of which I attach a crank, marked H, by which I turn the wheel, on which wheel I place a band I, I, that passes to the pulley, marked D, on the cylinder A, by which means I turn the cylinder with great velocity, and when the machine is put in motion, the corn to be shelled, I take in my hand, and thrust one end in to the fistular at J, holding fast the other end, until it passes half way in. I then draw it out, and turn the other end and thrust it into the fistular, holding fast the cob, until the corn is shelled off, the cob is then thrown aside, and another ear taken and applied in the same way to the fistular, as described above, and so on, till I have shelled as much corn as I wish.

The fistular cylinder, as above described is inclosed in a small box C to prevent the corn from scattering, having a hole in front of the fistular at J, of sufficient size to admit a large ear of corn to pass in; this box has a spout at the bottom shown at K, which conveys the corn off, when it is shelled, into any receptacle, where I wish to deposit it.

What I claim as my invention is—

1. Shelling corn with spurs or teeth on the end of a fistular cylinder which admits the cob to pass into the fistular. And the small end of the cob almost invariably contains rotten corn which is permitted to pass between the spurs or teeth, on the fistular cylinder, without touching, and thus it remains on the cob and is separated from the sound corn.

2. I likewise claim the originality of constructing a double sheller, that is, one at each end of the fistular cylinder.

WM. McALL.

Witnesses:
 PETER J. WALKER,
 S. B. GLAZENER.